J. L. H. MOSIER.
COUPLING FOR CARRIAGES.

No. 184,047. Patented Nov. 7, 1876.

Witnesses:

Inventor:

UNITED STATES PATENT OFFICE.

JOHN L. H. MOSIER, OF BROOKLYN, ASSIGNOR TO CORNELIUS VAN HORN, OF NEW YORK, N. Y.

IMPROVEMENT IN COUPLINGS FOR CARRIAGES.

Specification forming part of Letters Patent No. 184,047, dated November 7, 1876; application filed November 22, 1875.

*To all whom it may concern:*

Be it known that I, JOHN L. H. MOSIER, of the city of Brooklyn, county of Kings and State of New York, have invented a new and Improved Coupling or Connection Between the Reach and Axle of Carriages; and I do hereby declare that the following is a full, clear, and exact description thereof, reference being had to the accompanying drawing, wherein—

Figure 1:
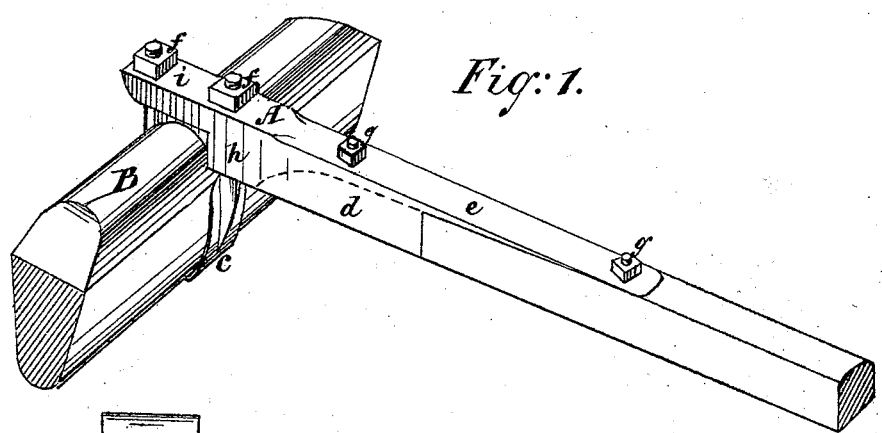
Figure 2:
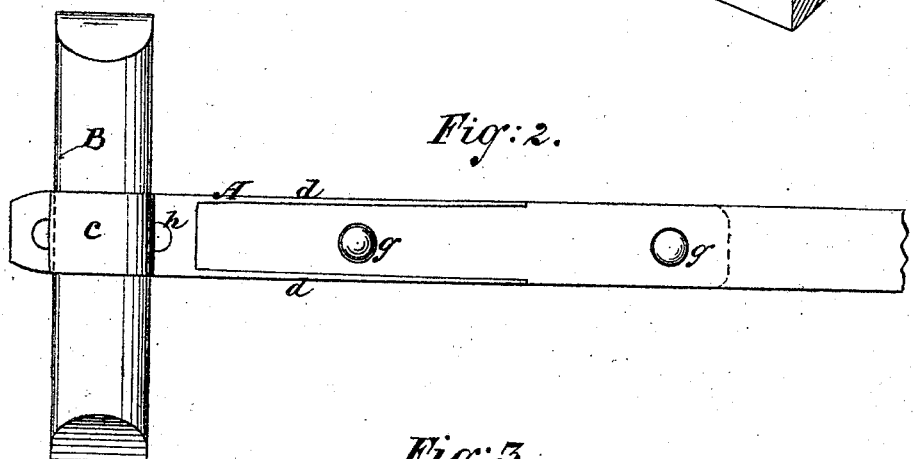
Figure 3:
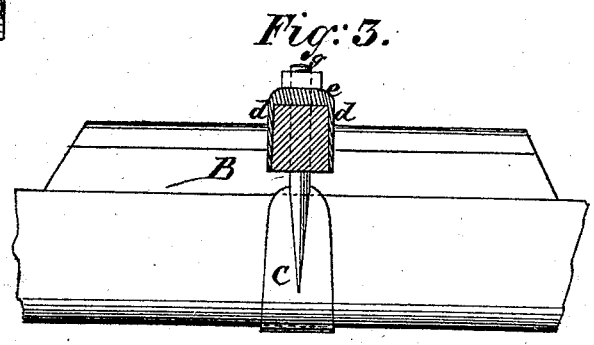

Figure 1 is a side and bottom view of the coupling in perspective. Fig. 2 is a top view of the device. Fig. 3 is a cross-section of the same.

Heretofore these couplings have been made with a clip on or through the end of the reach. The connection has been made by running the wooden reach under the axle, with the ends of the clip passing through it, by attaching the side of the clip to an iron shoe at the end of the reach, and using an independent yoke, and by continuing the shoe out to form the yoke, and passing the clip through holes drilled therein.

The ends of the reach have been braced, tied, and strengthened by metal plates, top and bottom bolted or riveted on.

My invention consists in an improved metal shoe for the end of the reach, so constructed that it comprises a yoke and bottom, and side plates or braces, which I propose to make of one piece of metal.

To enable others skilled in the art to make and use my invention, I proceed to describe the same.

A, in Fig. 1, represents my device, which is fastened onto the end of the reach by the bolts and nuts $g$ $g$. Its outer end $h$ is formed with a shoulder with an extension, $i$, to fit over the axle and constitute the yoke for the clip $c$, and is provided with vertical holes drilled therein, through which the ends of the clip pass to be firmly secured by the nuts $f$ $f$. This outer end $h$ and yoke $i$ are made of solid metal and are of great strength. At the point on the under side thereof, indicated by the dotted line in Fig. 1, commences a pocket, the shape of which is indicated by that line. A section of this pocket is shown in Fig. 3. This pocket is formed by the bottom and side plates, joined on their edges, and the outer end or shoulder $h$, which is hollowed out, on the curved dotted line shown in Fig. 1.

I prefer to spread the side plates $d$ $d$ slightly outward from the plate $e$ to insure a better and firmer point or connection with the end of the reach. The plate $e$ is continued out beyond the side plates $d$ $d$, to prevent the breakage of the reach at the end of the side plates.

This improved device may be made entire from one piece of metal, or from several pieces securely welded, soldered, or otherwise fastened together.

By this combination of yoke, shoulder, and braces, the device produced is not only exceedingly strong and durable, but also a cheaper and very convenient connection.

Having described my invention, what I desire to secure by Letters Patent is—

1. An improved connection for the reach and axle of a vehicle, wherein the yoke, shoulder, and plates are made of one piece of metal, substantially as described.

2. An improved reach and axle connection, with a pocket or recess therein for the reception of the end of the reach, constructed and arranged substantially as described.

3. In a connection for a reach and axle, the shoulder $h$, yoke $i$, and plates $d$ $d$ and $e$, constructed and arranged substantially as described.

4. In a reach and axle connection, the combination of the plates or braces $d$ $d$ and $e$, substantially as described.

JOHN L. H. MOSIER.

Witnesses:
E. B. BARNUM,
FRED. W. REBHANN.